(12) United States Patent
Izumi et al.

(10) Patent No.: US 10,855,084 B2
(45) Date of Patent: Dec. 1, 2020

(54) POWER CONVERSION SYSTEM FOR POWER SYSTEM INTERCONNECTION

(71) Applicant: Mitsubishi Electric Corporation, Chiyoda-ku (JP)

(72) Inventors: Kikuo Izumi, Chiyoda-ku (JP); Tatsuya Okuda, Chiyoda-ku (JP); Masahiro Sugahara, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 62 days.

(21) Appl. No.: 16/092,406

(22) PCT Filed: May 12, 2017

(86) PCT No.: PCT/JP2017/018062
§ 371 (c)(1),
(2) Date: Oct. 9, 2018

(87) PCT Pub. No.: WO2017/199878
PCT Pub. Date: Nov. 23, 2017

(65) Prior Publication Data
US 2020/0059103 A1 Feb. 20, 2020

(30) Foreign Application Priority Data

May 19, 2016 (JP) .................................. 2016-100028

(51) Int. Cl.
*H02J 3/46* (2006.01)
*H02J 3/32* (2006.01)
*H02J 3/38* (2006.01)

(52) U.S. Cl.
CPC ........ *H02J 3/46* (2013.01); *H02J 3/32* (2013.01); *H02J 3/383* (2013.01)

(58) Field of Classification Search
CPC ........ H02J 3/46; H02J 3/32; H02J 3/383; H02J 3/38
See application file for complete search history.

(56) References Cited

U.S. PATENT DOCUMENTS

2011/0148205 A1\* 6/2011 Moon ................... H02J 3/32
307/65

FOREIGN PATENT DOCUMENTS

| JP | 5-344655 A | 12/1993 |
| JP | 2002-142365 A | 5/2002 |

(Continued)

OTHER PUBLICATIONS

International Search Report dated Jun. 13, 2017 in PCT/JP2017/018062 filed May 12, 2017.

*Primary Examiner* — Carlos Amaya
(74) *Attorney, Agent, or Firm* — Xsensus LLP

(57) ABSTRACT

A power system and a power conversion device are interconnected via an interconnection switch. A user load is provided between the power conversion device and the interconnection switch. In parallel with the interconnection switch, a series circuit composed of a load disconnection switch and a voltage maintenance load for maintaining voltage of the user load at the time of system momentary power interruption is connected. Control is performed such that, when momentary power interruption occurs, the interconnection switch is turned off and the power system and the power conversion device are connected via the voltage maintenance load, and at the time of recovery from the momentary power interruption, the interconnection switch is turned on, further the power system and the power conversion device are connected.

22 Claims, 13 Drawing Sheets

(56) References Cited

FOREIGN PATENT DOCUMENTS

| JP | 2002-233050 A | 8/2002 |
|----|---------------|--------|
| JP | 2003-333753 A | 11/2003 |

* cited by examiner

POWER CONVERSION SYSTEM FOR POWER SYSTEM INTERCONNECTION

TECHNICAL FIELD

The present invention relates to a power conversion system for system interconnection, which connects an electric generation and power storage device such as a solar battery or a storage battery to a power system and controls flow power from the power system, and which disconnects from the power system and supplies power to a load such as a home electric appliance.

BACKGROUND ART

In conventional technology, a power conversion system for system interconnection is proposed which establishes connection with a power system via an interconnection switch and in which a load is connected to an output part of a power converter, and the power converter system includes interconnection switch control means for performing open/close control of an interconnection switch by detecting the state of the power system; switch current command generating means for outputting a switch current command in accordance with the open/close control state of the interconnection switch; switch current control means for controlling the conduction current of the interconnection switch so as to follow the switch current command; and converter control means for controlling output current of the power converter, using a control signal from the switch current control means as a current command (see, for example, Patent Document 1 shown below).

CITATION LIST

Patent Document

Patent Document 1: Japanese Laid-Open Patent Publication No. 2003-333753

SUMMARY OF THE INVENTION

Problems to be Solved by the Invention

In a power conversion system for system interconnection, at the time of occurrence of momentary power interruption of the power system, it is required that disconnection from the power system is not performed for a certain period so that the power system state at the time of recovery from the momentary power interruption can be maintained in the state before occurrence of the momentary power interruption.

On the other hand, at the time of power outage, the interconnection switch is turned off and thus voltage supplied from the power system to a user load is interrupted. When such an event has occurred, in the user load such as a personal computer, such a trouble that the user load is stopped and data are lost is conceivable and therefore it is required to continue to apply voltage so that operation of the user load can be continued even when power outage has occurred.

In the conventional power conversion system for system interconnection as described in Patent Document 1, when momentary power interruption of the power system has occurred, switch current of the interconnection switch connecting the power system and the user load is reduced, whereby it is possible to disconnect the power system while reducing switch burden. However, voltage of the user load reduces during a transition period of switch operation and, depending on the transition period and the momentary power interruption remaining voltage, the user load might be stopped. In addition, there is a possibility that the power state between the power system and the user changes before and after recovery from the momentary power interruption and this influences the power system.

An object of the present invention is to provide a power conversion system for system interconnection, which keeps connection between the power system and the user load when momentary power interruption has occurred, and maintains voltage of the user load within a voltage range in which the operation can be continued even during the momentary power interruption period, and which, at the time of recovery from the momentary power interruption, can return the power state between the power system and the user to the state before occurrence of the momentary power interruption, so as to suppress influence on the power system.

Means of Solution to the Problems

The present invention is a power conversion system for system interconnection, which includes a power conversion device connected to a power system via an interconnection switch. Further in the power conversion system for system interconnection, in parallel with the interconnection switch, a series circuit is connected which is composed of a voltage maintenance load for maintaining necessary voltage for a user load at a time of momentary power interruption of the power system, and a load disconnection switch for disconnecting from the voltage maintenance load. And the power conversion system includes a power information detection unit which detects at least one of system power information about the power system, load power information about load power supplied to the user load, and flow power information about flow power between the user load and the interconnection switch; a current/voltage command generation unit which generates an output command for controlling output current of the power conversion device, on the basis of the power information from the power information detection unit; a converter control unit which controls the power conversion device on the basis of the output command from the current/voltage command generation unit; and a switch changeover control unit which generates a driving signal for respectively operating the interconnection switch and the load disconnection switch, on the basis of the power information from the power information detection unit.

Effect of the Invention

According to the present invention, when momentary power interruption has occurred, the interconnection switch is turned off. But the user load and the power converter are connected to the power system via the voltage maintenance load by the load disconnection switch and voltage of the user load can be maintained at certain voltage owing to output of the power converter. Thus, it is possible to prevent the user load from being stopped at the time of momentary power interruption. In addition, at the time of recovery from the momentary power interruption, when the interconnection switch is turned on, the power state between the power system and the user can be returned to the state before occurrence of the momentary power interruption. Thus, influence on the power system can be suppressed and recovery of flow power to the power system can be easily performed.

EMBODIMENTS FOR CARRYING OUT THE INVENTION

Embodiment 1

Figure 1:
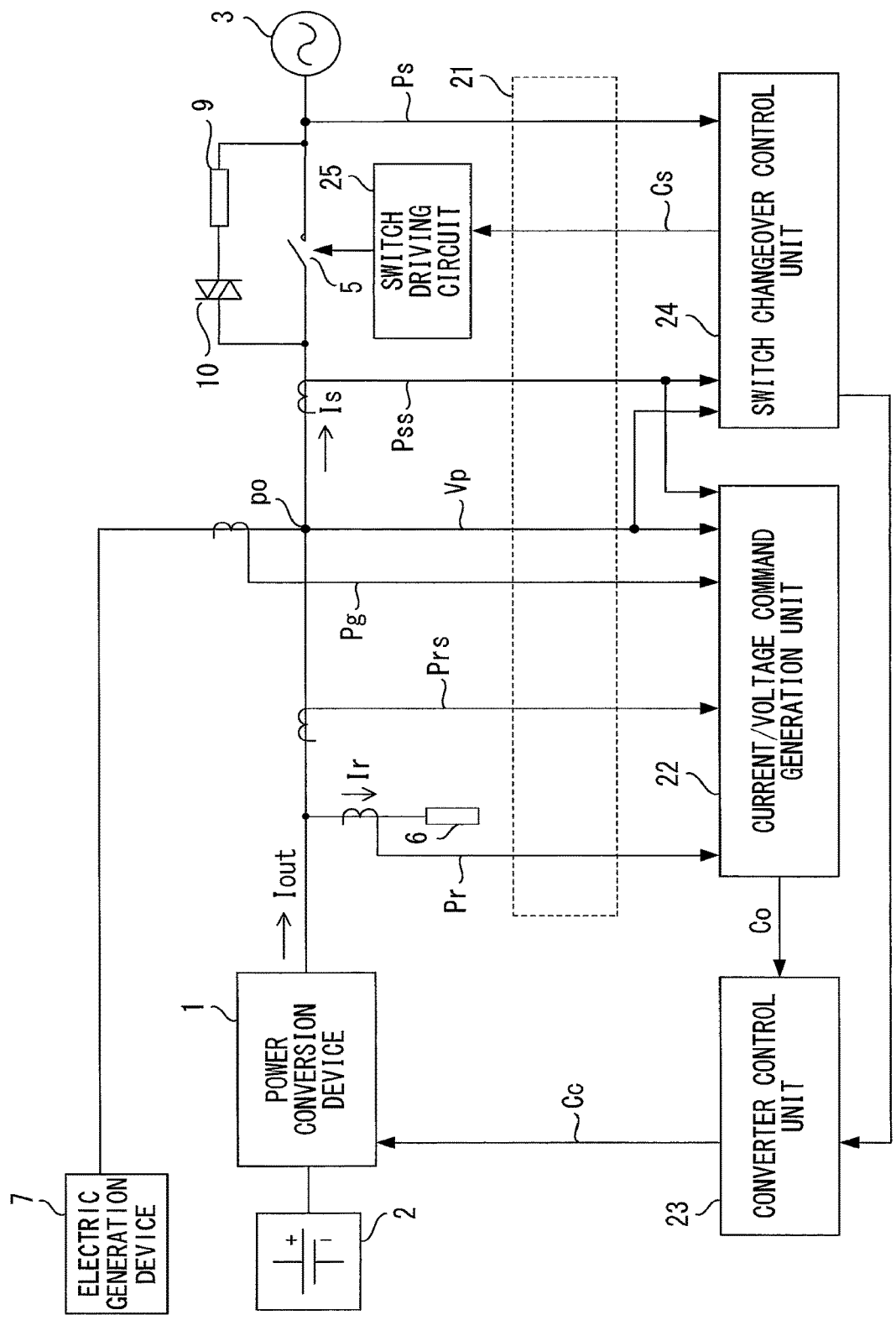
FIG. 1 is a schematic configuration diagram showing an entire power conversion system for system interconnection according to embodiment 1 of the present invention.

FIG. 1 is a schematic configuration diagram showing an entire power conversion system for system interconnection according to embodiment 1 of the present invention.

The power conversion system for system interconnection according to the present embodiment 1 includes a power conversion device 1 which performs DC/DC conversion, DC/AC conversion, or the like for output power from a power supply based on a power storage device 2 such as a storage battery or an electric vehicle (EV). Between the output side of the power conversion device 1 and the power system 3, an interconnection switch 5 is provided in order to disconnect the power system 3 and the power conversion device 1 when abnormality such as power outage occurs in the power system 3. Between the power conversion device 1 and the interconnection switch 5, a user load 6 and an electric generation device 7 such as a solar battery are connected.

In parallel with the interconnection switch 5, a voltage maintenance load 9 for keeping output voltage of the power conversion device 1 at a certain level or higher at the time of momentary power interruption, and a load disconnection switch 10 for disconnecting from the voltage maintenance load 9, are connected in series to each other.

Further, the power conversion system for system interconnection includes: a power information detection unit 21 for detecting the power supply-and-demand condition with respect to the power system 3 and the state of the power system 3 (specifically, for example, system power Ps of the power system 3, generated power Pg of the electric generation device 7, load power Pr supplied to the user load 6, power reception point voltage Vp at a power reception point po in which output of the power conversion device 1 and output of the electric generation device 7 merge, flow power Pss from the power conversion device 1 toward the power system 3, reverse flow power Prs from the power system 3 toward the user load 6, etc.); a current/voltage command generation unit 22 which generates an output command Co of current/voltage to be outputted to the power reception point po by the power conversion device 1, on the basis of detection output from the power information detection unit 21; a converter control unit 23 which outputs a power conversion device driving command Cc for controlling operation of the power conversion device 1, on the basis of the output command Co from the current/voltage command generation unit 22; a switch changeover control unit 24 which performs ON/OFF control of the interconnection switch 5 and the load disconnection switch 10 on the basis of detection output from the power information detection unit 21; and a switch driving circuit 25 for turning on or off the interconnection switch 5 and the load disconnection switch 10 on the basis of a switch driving command Cs from the switch changeover control unit 24.

As the load disconnection switch 10, for example, a triac is used. As the voltage maintenance load 9, for example, an inductance, a capacitor, a resistor, or the like can be used, or voltage drop Vrs may be created in a simulated manner by an inverter or a converter configured by an active element such as IGBT.

The power conversion device 1 in the power conversion system for system interconnection according to embodiment 1 of the present invention is controlled to switch the operation mode between an interconnection operation mode Mr in which connection to the power system 3 is established and the power flow amount between the power system 3 and the user load 6 or the electric generation device 7 is controlled by control of output current of the power conversion device 1, and an autonomous operation mode Mi in which output voltage of the power conversion device 1 is controlled so that voltage applied to the user load 6 or the electric generation device 7 becomes a predetermined value in the case of being released from the power system 3.

Here, the user load 6 or the electric generation device 7 normally stops operation when, due to power outage or the like, voltage reduction in the power system 3 has continued during a certain period. When momentary power interruption has occurred, if the electric generation device 7 or the power conversion system for system interconnection is stopped and released from the power system 3 or if output power of the electric generation device 7 or the power conversion system for system interconnection changes before and after the momentary power interruption, power flow between the power system 3 and the user load 6 or the electric generation device 7 sharply changes before and after occurrence of the momentary power interruption. Therefore, output of the power conversion device 1 is required to be adjusted so as to prevent change in power flow between the power system 3 and the user load 6 or the electric generation device 7 as much as possible before and after occurrence of the momentary power interruption.

Figure 2:
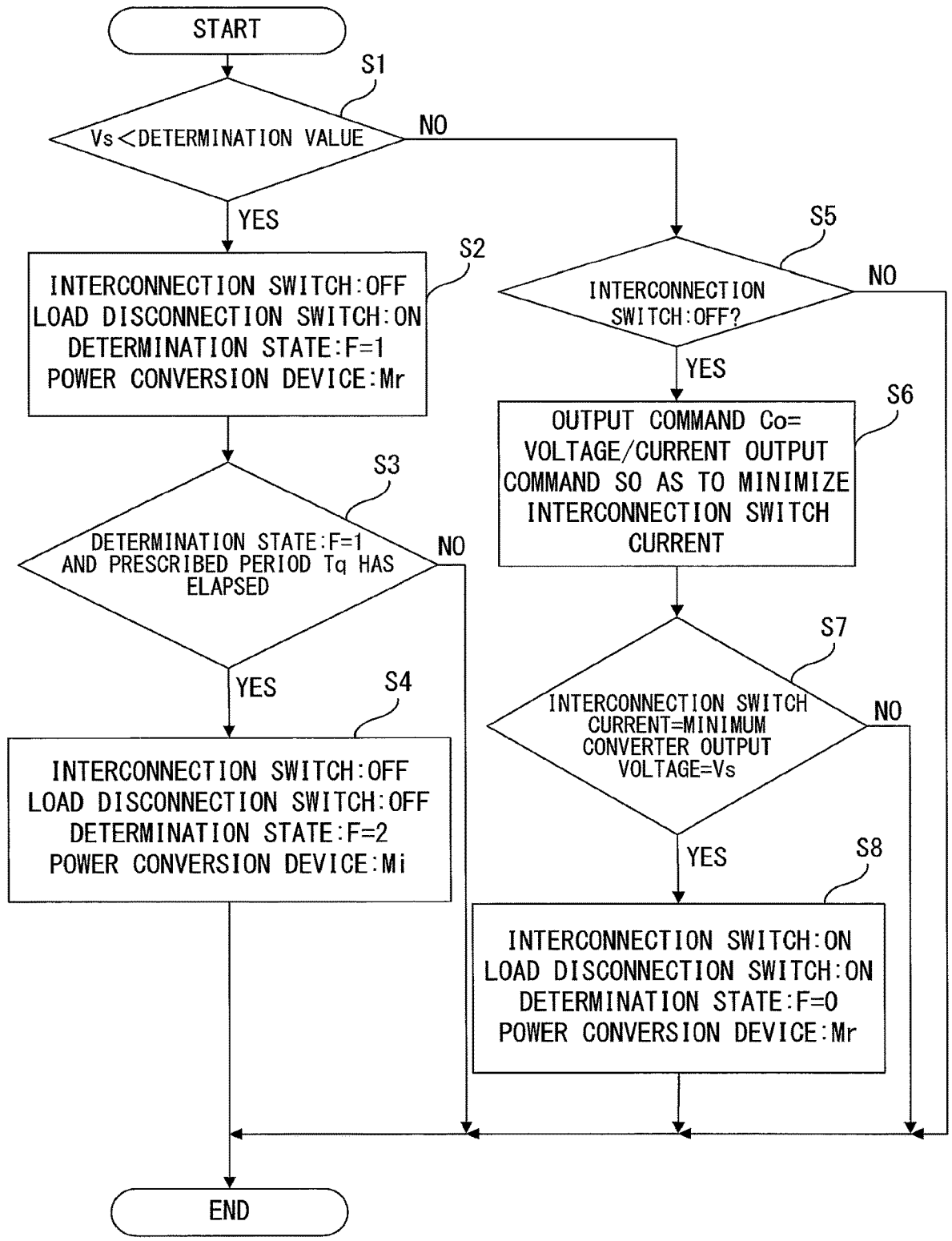
FIG. 2 is a flowchart showing an example of an operation method in accordance with state change of a power system in the power conversion system for system interconnection according to embodiment 1 of the present invention.
Figure 3:
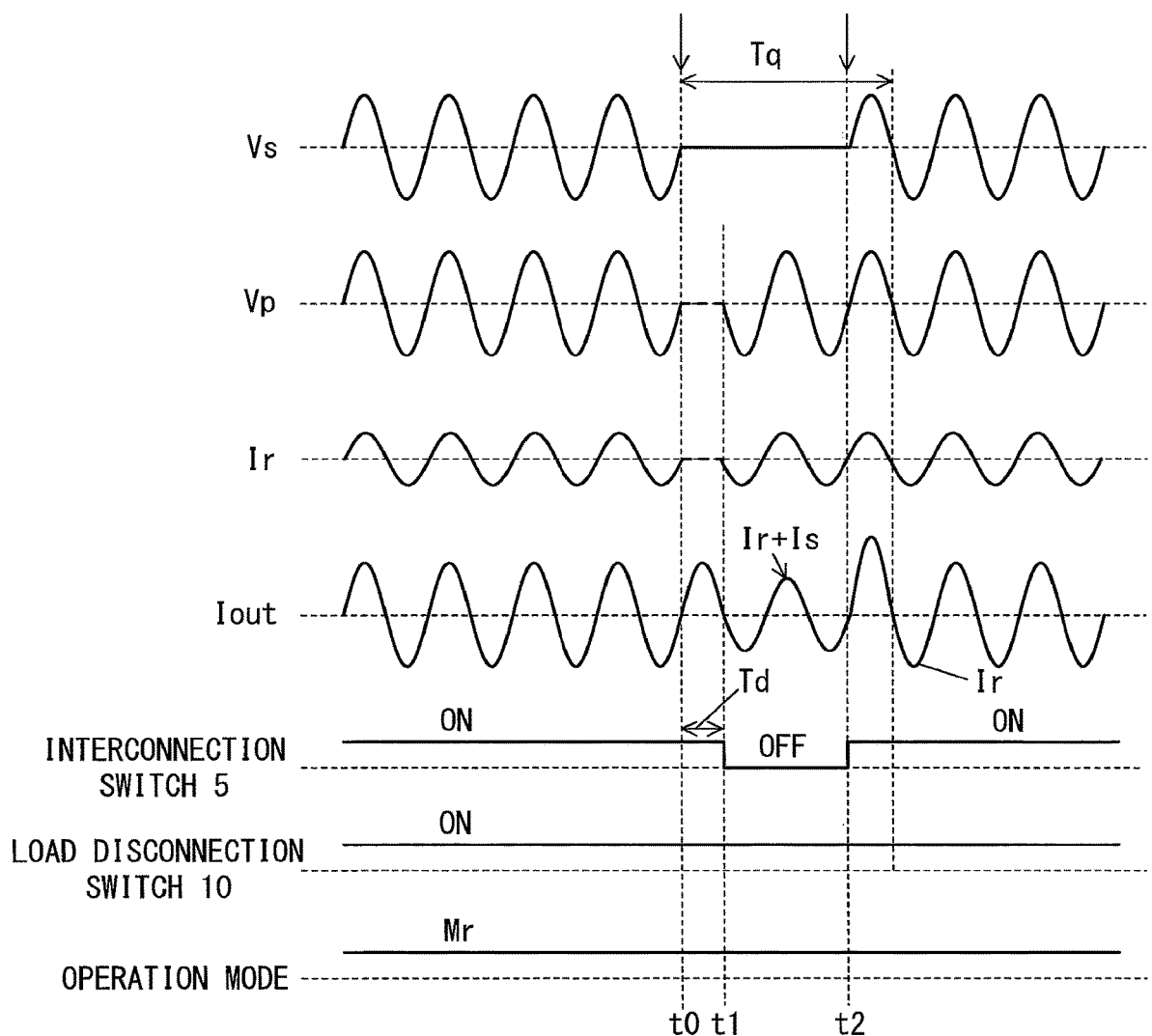
FIG. 3 is a timing chart showing operation of the power conversion system for system interconnection according to embodiment 1 of the present invention, when momentary power interruption occurs.
Figure 4:
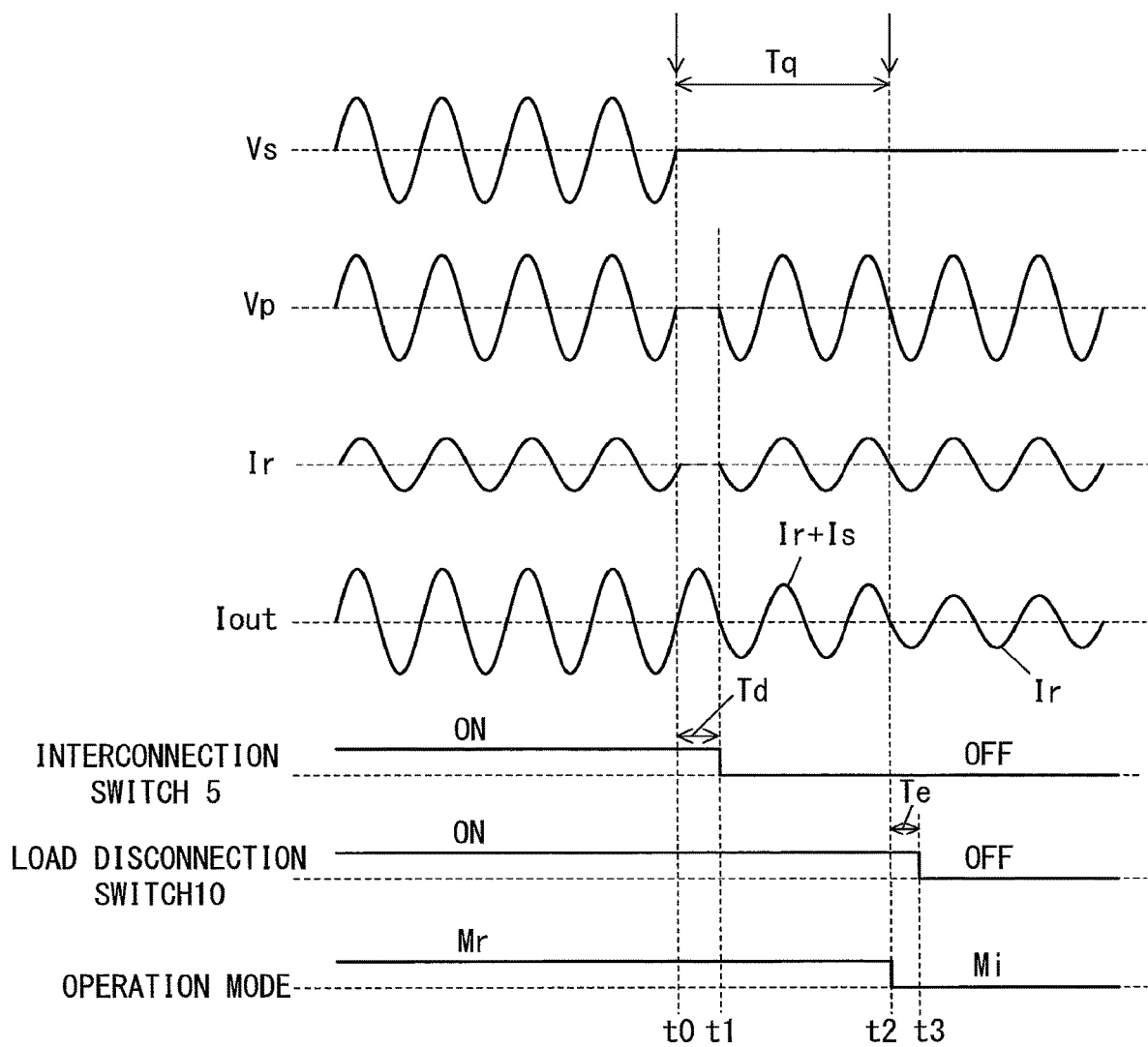
FIG. 4 is a timing chart showing operation of the power conversion system for system interconnection according to embodiment 1 of the present invention, when power outage occurs.

FIG. 2 is a flowchart showing an example of an operation method in accordance with state change of the power system 3 in the power conversion system for system interconnection according to embodiment 1 of the present invention. FIG. 3 is a timing chart showing operation of the power conversion system for system interconnection when momentary power interruption occurs. FIG. 4 is a timing chart showing operation when power outage occurs. In FIG. 3 and FIG. 4, the electric generation device 7 is not taken into consideration, for the purpose of simplification of description.

Hereinafter, operation of the power conversion system for system interconnection in accordance with state change of the power system 3 will be described with reference to the flowchart shown in FIG. 2 and the timing charts shown in FIG. 3 and FIG. 4. In FIG. 2, the process from start to end is repeatedly executed with a certain calculation cycle.

In the case where the power system 3 is determined to be maintained at normal system voltage Vs on the basis of system information (information such as system power Ps, generated power Pg, load power Pr, and power reception point voltage Vp described above) detected by the power information detection unit 21 (flag F=0), the interconnection switch 5 is turned on, the load disconnection switch 10 is also always turned on, and the voltage maintenance load 9 is always connected to the power system 3. At this time, since the impedance of the interconnection switch 5 in an ON state is sufficiently smaller than the impedance of the voltage maintenance load 9, current between the power system 3 and the user load 6 passes through the interconnection switch 5 mainly.

When the power system 3 is normal, the power conversion system for system interconnection sets the operation state of the power conversion device 1 to the interconnection operation mode Mr and monitors the system voltage Vs of the power system 3 by the power information detection unit 21 (step S1). If the system voltage Vs becomes lower than a predetermined determination value (time t0 in FIG. 3), it is determined that momentary power interruption has occurred in the power system 3 (flag F=1), and the switch changeover control unit 24 controls the switch driving circuit 25 to turn off the interconnection switch 5 (time t1 in FIG. 3). Even in this case, the load disconnection switch 10 is maintained in an ON state and the power conversion device 1 is maintained in the interconnection operation mode Mr (step S2).

Figure 5:
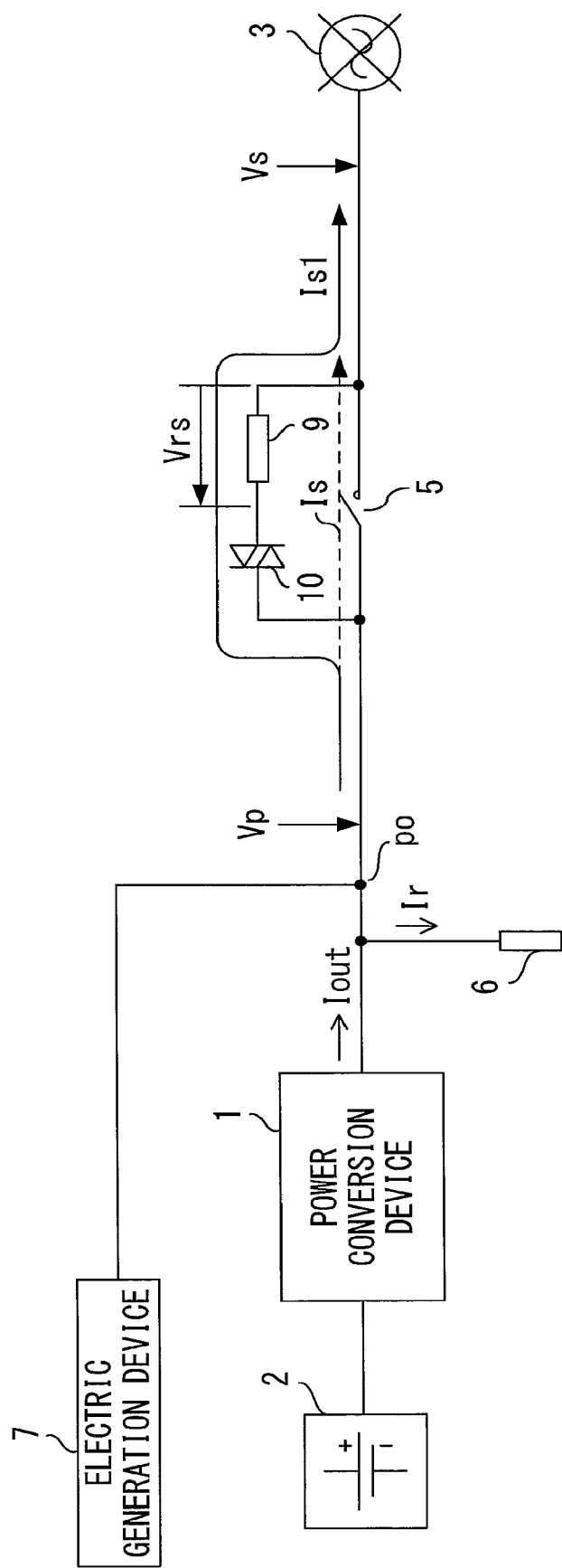
FIG. 5 is a diagram for illustrating a mechanism of maintenance of power reception point voltage by a voltage maintenance load in the power conversion system for system interconnection according to embodiment 1 of the present invention.

In step S2, when the interconnection switch 5 is turned off, the user load 6 and the power system 3 are connected via the voltage maintenance load 9. At this time, as shown in FIG. 5, in the case where, before occurrence of power outage, power is flowed from the power conversion system for system interconnection or the electric generation device 7 to the power system 3 (case of selling power), voltage drop Vrs occurs across the voltage maintenance load 9 by the flow current. Therefore, even when the system voltage Vs of the power system 3 has reduced, the end voltage (power reception point voltage at power reception point po) Vp of the user load 6 becomes Vp=Vs+Vrs and thus Vp is kept at a certain or higher value so as to fall within an allowable voltage range required in order to maintain operation of the user load 6.

Thus, a period during which the end voltage Vp of the user load 6 reduces is only a delay period Td from a time (time t0) when the system voltage Vs of the power system 3 becomes lower than the predetermined determination value to a time (time t1) when the interconnection switch 5 is turned off. The delay period Td is, normally, several microseconds to several tens of microseconds. Normally, the delay period Td is sufficiently shorter than a period until the user load 6 or the electric generation device 7 stops due to voltage reduction, and therefore it is possible to prevent unintentional stop of the user load 6.

Here, flow current Is (indicated by broken line in FIG. 5) when the interconnection switch 5 is ON and flow current Is1 (indicated by solid line in FIG. 5) when the interconnection switch 5 is turned off are not necessarily the same, and depending on the impedance of the voltage maintenance load 9 or the magnitude of the flow current Is1 at the time of power outage, the power reception point voltage Vp (=Vs+Vrs) when the interconnection switch 5 is turned off is excessively distorted or becomes excessively large voltage. Then, if excessively large voltage is applied to the user load 6, this might lead to unnecessary stop or breakage of the user load 6.

If the voltage maintenance load 9 is set to have a sufficiently large impedance in advance so as to suppress power consumption thereof, voltage that occurs as the voltage drop Vrs with respect to flow current Is1 when the interconnection switch 5 is turned off becomes large, and thus voltage distortion or excessively large voltage as described above is likely to occur. In order to avoid this, if the impedance of the voltage maintenance load 9 is set to be small to a certain extent, conversely, power consumption increases and the cost or the size of the voltage maintenance load 9 might increase.

Figure 6:
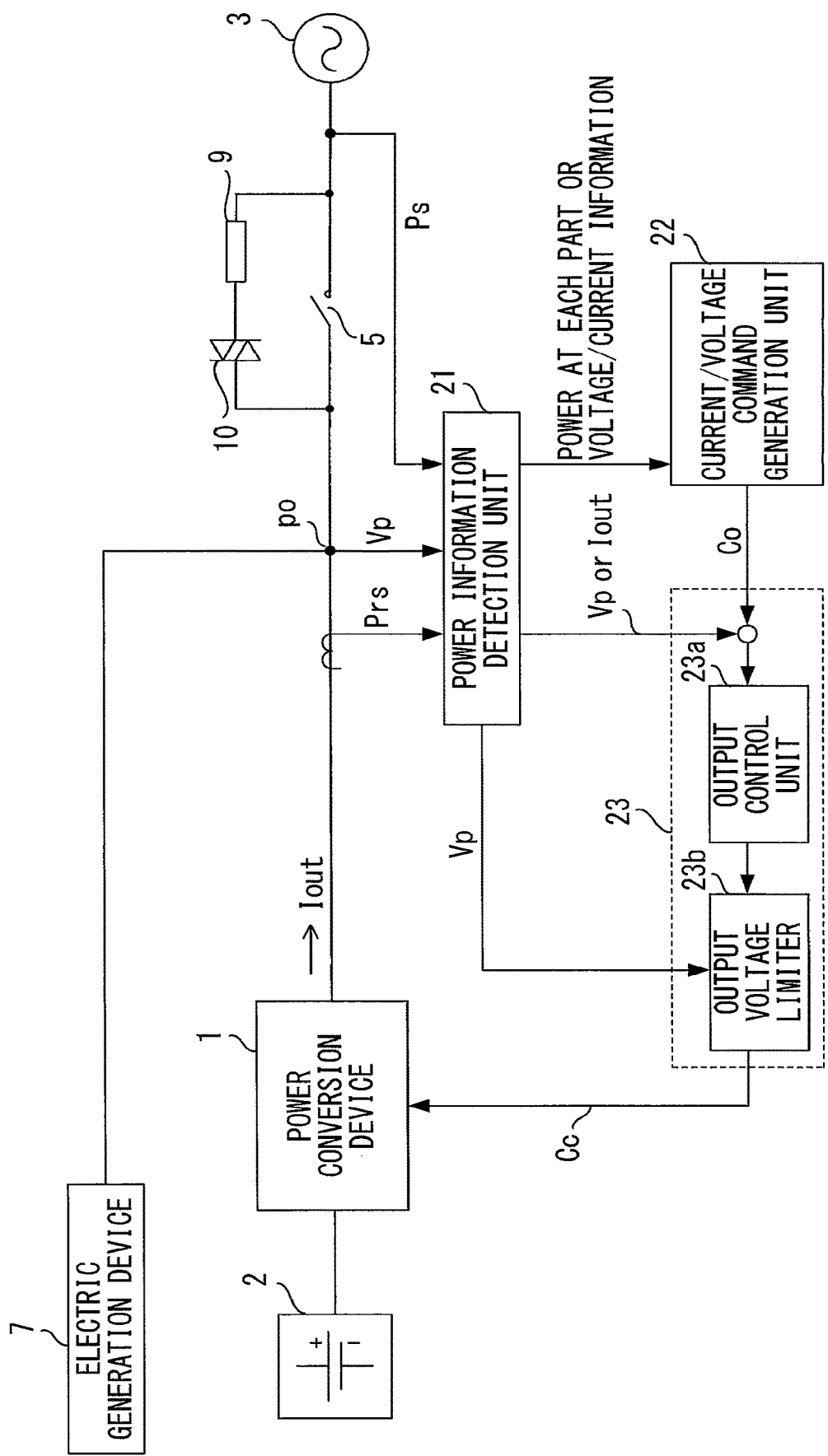
FIG. 6 is a diagram showing the configuration of the power conversion system for system interconnection according to embodiment 1 of the present invention, in particular, the internal configuration of a converter control unit.

In view of the above, in the power conversion system for system interconnection according to embodiment 1 of the present invention, the converter control unit 23 for the power conversion device 1 is configured as shown in FIG. 6, as a measure in the case where the interconnection switch 5 is turned off. FIG. 6 is a diagram for mainly explaining the configuration of the converter control unit 23 among others in the power conversion system for system interconnection in FIG. 1.

In FIG. 6, the converter control unit 23 includes an output control unit 23a and an output voltage limiter 23b. Normally, on the basis of the output command Co from the current/voltage command generation unit 22, the output control unit 23a drives the power conversion device 1 in accordance with the output command Co. Then, if the power information detection unit 21 detects momentary power interruption of the power system 3 and the power reception point voltage Vp becomes excessively large voltage exceeding a predetermined reference value, the output voltage limiter 23b of the converter control unit 23 is operated, and drives the power conversion device 1 so as to maintain the power reception point voltage Vp at a certain level or lower and so as to reduce voltage distortion. In this way, excessive voltage distortion and excessively large voltage are prevented from occurring at the power reception point po due to the voltage maintenance load 9 or the magnitude of the flow current Is1 between the power conversion device 1 and the power system 3 when the interconnection switch 5 is turned off.

By such control, it is possible to apply appropriate voltage to the user load 6 when the interconnection switch 5 is turned off due to occurrence of momentary power interruption. And even if the voltage maintenance load 9 has a comparatively large impedance, the power conversion device 1 is controlled so as to keep the power reception point voltage Vp to be constant. Therefore power consumption of the voltage maintenance load 9 can be suppressed and increase in the cost and the size of the voltage maintenance load 9 can be suppressed.

Next, as shown in the flowchart in FIG. 2, the power conversion system for system interconnection monitors the elapsed time from the time (time t0 in FIG. 3) when the momentary power interruption of voltage of the power system 3 is identified (step S3).

In a state in which it is determined that momentary power interruption has occurred in the power system 3 (flag F=1), if, by the time when the elapsed time from the momentary power interruption determination time (time t0) reaches a prescribed period Tq (i.e., after determination of NO in step S3), the system voltage is recovered to the determination value or higher (NO in step S1), momentary power interruption in the power system 3 becomes definite.

If the momentary power interruption is definite, next, the switch changeover control unit 24 determines whether the interconnection switch 5 is OFF (step S5) or not. If it is confirmed that the interconnection switch 5 is OFF in step S5, the current/voltage command generation unit 22 gives the voltage/current output command Co to the power conversion device 1 so that current passing through the interconnection switch 5 after the interconnection switch 5 is turned on becomes as minimum as possible, on the basis of information such as the load power Pr, the reverse flow power Prs, and the generated power Pg detected by the power information detection unit 21 (step S6). Since the converter control unit 23 drives the power conversion device 1 on the basis of the output command Co, the power conversion device 1 outputs current Iout that follows the output command Co.

Then, on the basis of the detection output of the power information detection unit 21, the switch changeover control unit 24 determines whether or not, by control of the output current Iout of the power conversion device 1, the flow current Is of the interconnection switch 5 when the interconnection switch 5 is turned on is minimum and a difference between the recovered system voltage Vs and the power reception point voltage Vp decided by the power conversion device 1 and the voltage maintenance load 9 becomes a certain value or lower (step S7). Then, if it is determined that the flow current Is after the interconnection switch 5 is turned on is minimum and the difference between the recovered system voltage Vs and the power reception point voltage Vp becomes a certain value or lower, the switch changeover control unit 24 controls the switch driving circuit 25 so as to turn on the interconnection switch 5 (time t2 in FIG. 3) (step S8).

This changeover operation can reduce burden on the interconnection switch 5 when the interconnection switch 5 is turned on. It is noted that, when the momentary power interruption becomes definite, the load disconnection switch 10 has been kept in an ON state. Therefore the load disconnection switch 10 is not newly turned on in step S8.

After the interconnection switch 5 is turned on, the current/voltage command generation unit 22 gives the output command to the converter control unit 23 so that flow power between the power system 3 and the user load 6 or the electric generation device 7 becomes substantially the same before and after occurrence of the momentary power interruption. And the converter control unit 23 controls the power conversion device 1 accordingly. Thus, the flow power between the power system 3 and the user load 6 or the electric generation device 7 can be kept the same before and after the momentary power interruption, whereby it is possible to suppress influence on the power system 3 by occurrence of the momentary power interruption.

On the other hand, in a state in which it is determined that momentary power interruption has occurred in the power system 3 in step S3 (flag F=1), if voltage of the power system 3 has not been recovered to the determination value or higher even when the prescribed period Tq has elapsed from the time (time t0 in FIG. 4) of momentary power interruption determination of the system voltage (YES in step S3), it is determined that power outage has occurred in the power system 3 (flag F=2) in step S4. Then, on the basis of the output command from the current/voltage command generation unit 22, the converter control unit 23 switches the output state of the power conversion device 1 from the interconnection operation mode Mr to the autonomous operation mode Mi (time t2 in FIG. 4), and in addition, the switch changeover control unit 24 outputs a command for turning off the load disconnection switch 10. Whereby the load disconnection switch 10 is turned off by the switch driving circuit 25 after a certain delay period Te elapses (time t3 in FIG. 4).

Thereafter, as time elapses, if the system voltage Vs of the power system 3 is recovered to the predetermined determination value or higher (NO in step S1), the switch changeover control unit 24 determines whether the interconnection switch 5 is OFF. Then, if it is confirmed that the interconnection switch 5 is OFF, in the same manner as the case where the system voltage Vs is recovered from momentary power interruption, the interconnection switch 5 is turned on through steps S6 to S8 and the load disconnection switch 10 is also turned on. Further the determination state is set to indicate that the system voltage Vs is normal (flag F=0). In addition, in accordance with the output command from the current/voltage command generation unit 22, the converter control unit 23 switches the power conversion device 1 from the autonomous operation mode Mi to the interconnection operation mode Mr (step S8).

After the interconnection switch 5 is turned on, in the same manner as the case of recovery from momentary power interruption, the current/voltage command generation unit 22 sets the output command for the power conversion device 1 so that flow power between the power system 3 and the user load 6 or the electric generation device 7 becomes substantially the same before and after occurrence of the power outage.

As described above, the power conversion system for system interconnection according to embodiment 1 of the present invention can prevent voltage applied to the user load 6 or the electric generation device 7 from reducing in a short time, by connecting to the power system 3 via the voltage maintenance load 9, in both cases of occurrence of momentary interruption and occurrence of power outage. In addition, the power reception point voltage Vp is controlled to be no more than a predetermined value by the power conversion device 1, whereby increase in the costs and the sizes of the voltage maintenance load 9 and the load disconnection switch 10 can be suppressed.

At the time of recovery from occurrence of momentary power interruption or occurrence of power outage, the interconnection switch 5 is connected again. At this time, the output current Iout of the power conversion device 1 is controlled so as to decrease the flow current Is flowing through the interconnection switch 5. And after the interconnection switch 5 is turned on, the output current Iout of the power conversion device 1 is controlled so that the flow power between the power system 3 and the user load 6 or the electric generation device 7 is not changed as much as possible before and after occurrence of momentary power interruption or power outage. Thus, appropriate voltage is applied to the user load 6 or the electric generation device 7, whereby unnecessary stop can be suppressed. In addition, abnormality of the power system 3 due to change in the flow power between the power system 3 and the user load 6 or the electric generation device 7 before and after occurrence of momentary power interruption or power outage can be suppressed.

Embodiment 2

Figure 7:
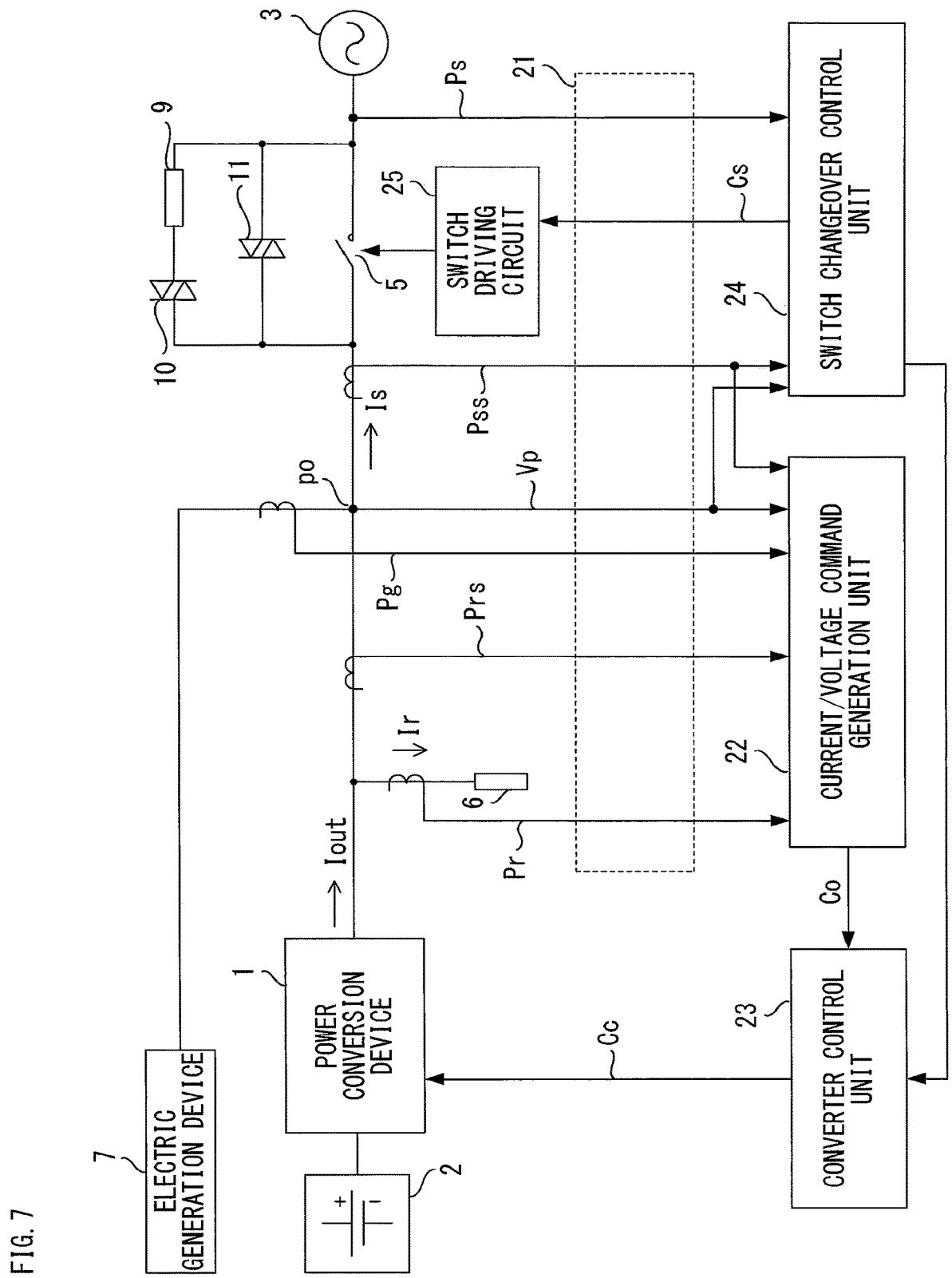
FIG. 7 is a schematic configuration diagram showing an entire power conversion system for system interconnection according to embodiment 2 of the present invention.

FIG. 7 is a schematic configuration diagram showing an entire power conversion system for system interconnection according to embodiment 2 of the present invention. Components corresponding to those shown in FIG. 1 in embodiment 1 are denoted by the same reference characters.

The power conversion system for system interconnection according to the present embodiment 2 is characterized as follows. In parallel with the interconnection switch 5, an auxiliary switch 11 is connected in addition to the series circuit formed by the voltage maintenance load 9 and the load disconnection switch 10. In addition, the switch changeover control unit 24 is configured so as to operate the interconnection switch 5, the load disconnection switch 10, and the auxiliary switch 11 via the switch driving circuit 25 on the basis of power information from the power information detection unit 21.

As the auxiliary switch 11, a semiconductor switch (for example, triac) capable of switching faster than the interconnection switch 5 is applied.

Operation of the power conversion system for system interconnection according to embodiment 2 is almost the same as that shown in embodiment 1, but the operation is different only in operation of the auxiliary switch 11.

Figure 8:
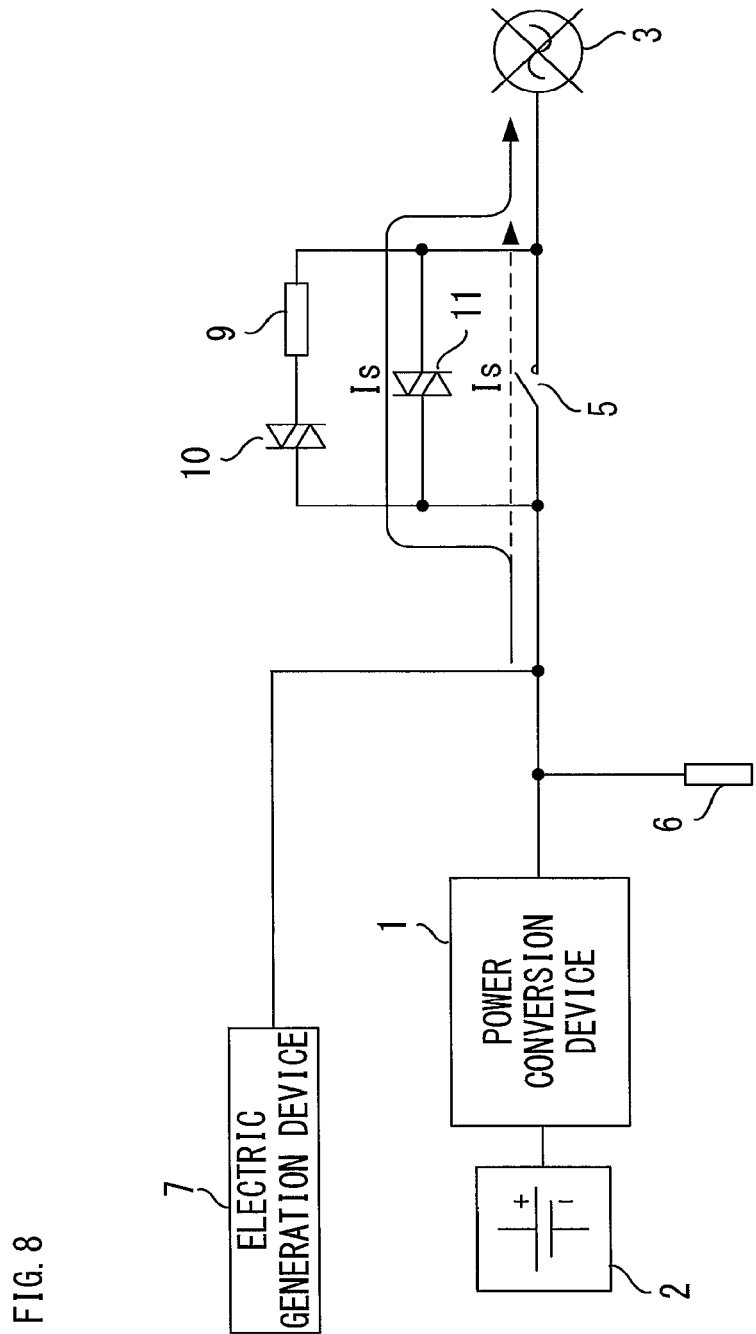
FIG. 8 is a diagram for illustrating ON/OFF operations of an interconnection switch and an auxiliary switch in the case where the auxiliary switch is provided in the power conversion system for system interconnection according to embodiment 2 of the present invention.
Figure 9:
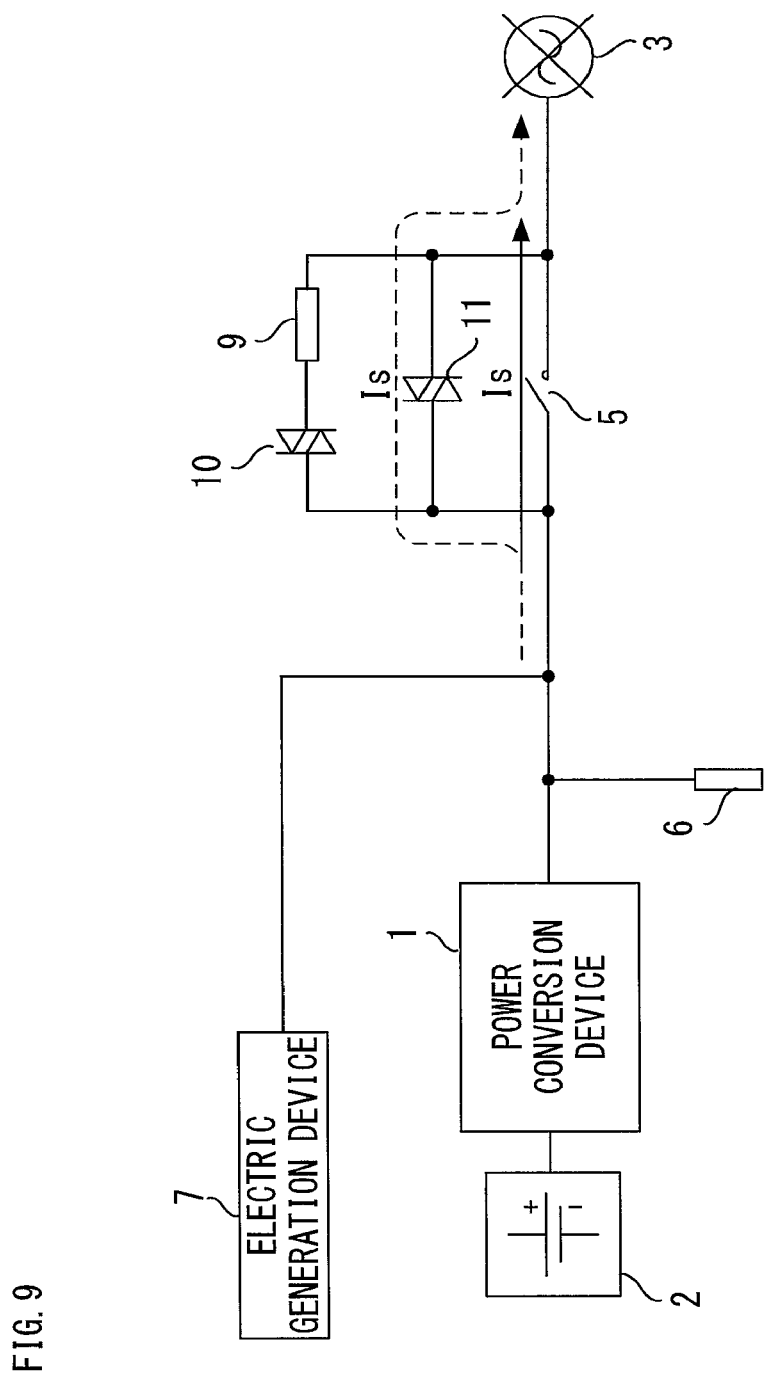
FIG. 9 is a diagram for illustrating ON/OFF operations of the interconnection switch and the auxiliary switch in the case where the auxiliary switch is provided in the power conversion system for system interconnection according to embodiment 2 of the present invention.

FIG. 8 and FIG. 9 are diagrams illustrating the outline of operation when the interconnection switch 5 is turned on or off in the case where the auxiliary switch 11 is provided. FIG. 8 shows operation when the user load 6, the electric generation device 7, and the power conversion device 1 are released from the power system 3, and FIG. 9 shows operation when the user load 6, the electric generation device 7, and the power conversion device 1 are interconnected with the power system 3.

In the case where the system is normal, the auxiliary switch 11 is always turned on by the switch changeover control unit 24, and the impedance of the interconnection switch 5 in an ON state is sufficiently smaller than the impedances of the auxiliary switch 11 and the aforementioned load disconnection switch 10 in ON states. Therefore current between the power system 3 and the power conversion system for system interconnection mainly flows through the interconnection switch 5.

As shown in FIG. 8, when the interconnection switch 5 is turned off due to occurrence of momentary power interruption, occurrence of power outage, or the like, the switch changeover control unit 24 maintains the auxiliary switch 11 in an ON state. Therefore, when the interconnection switch 5 is turned off, the flow current Is (indicated by broken line in FIG. 8) flowing through mainly the interconnection switch 5 transfers to the auxiliary switch 11 as indicated by solid line in FIG. 8. Thus, the interconnection switch 5 is switched at low current. As a result, switching burden on the interconnection switch 5 can be reduced and the interconnection switch 5 can be turned off at high speed.

After the interconnection switch 5 is turned off, the switch changeover control unit 24 turns off the auxiliary switch 11 and thus release from the power system 3 is completed. Since the auxiliary switch 11 can be switched faster than the interconnection switch 5, release from the power system 3 can be performed faster. Thus, it is possible to further shorten the reduction period of the power reception point voltage Vp.

As shown in FIG. 9, when the interconnection switch 5 is turned on as a result of power recovery or the like, the switch changeover control unit 24 turns on the auxiliary switch 11 first, and then turns on the interconnection switch 5. At this time, the auxiliary switch 11 can be turned on faster than the interconnection switch 5 and the interconnection switch 5 is turned on in a state in which current is flowing through the auxiliary switch 11. Thus the interconnection switch 5 is switched at low current, and switching burden thereon can be reduced.

It is noted that operations of the load disconnection switch 10 in the cases of momentary power interruption and power outage are the same as those in embodiment 1.

As described above, in the power conversion system for system interconnection according to embodiment 2 of the present invention, the auxiliary switch 11 is provided in parallel with the interconnection switch 5. Whereby switching burden on the interconnection switch 5 can be reduced and it is possible to perform release and interconnection between: the power system 3; and the user load 6, the electric generation device 7, and the power conversion device 1, faster than the case where only the interconnection switch 5 is provided.

In addition, in the power conversion system for system interconnection according to embodiment 2 of the present invention, the flow current Is flowing when the interconnection switch 5 is turned on/off can be reduced by the auxiliary switch 11. Therefore, it is not necessary to perform switching current reducing control by using the power conversion device 1 as shown in embodiment 1. That is, it is not necessary to provide the output voltage limiter 23b in the converter control unit 23 as shown in FIG. 6 or it is not necessary to perform control so as to minimize the flow current Is passing through the interconnection switch 5 after the interconnection switch 5 is turned on as shown in step S6 in FIG. 2. Thus, the control can be simplified.

Embodiment 3

Figure 10:
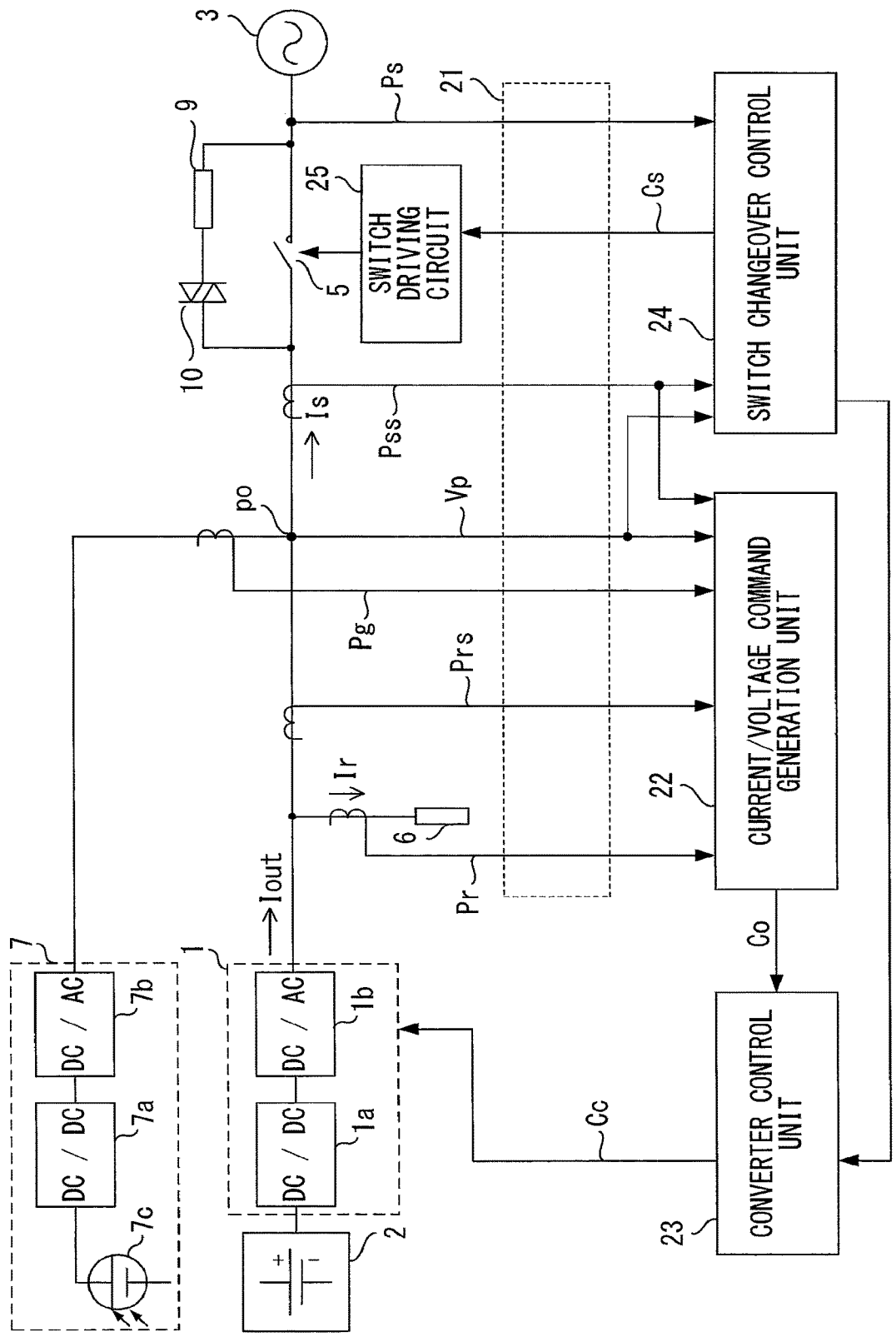
FIG. 10 is a configuration diagram showing a specific example of a power storage device, an electric generation device, and a power conversion device in the power conversion system for system interconnection in embodiment 1 shown in FIG. 1.
Figure 11:
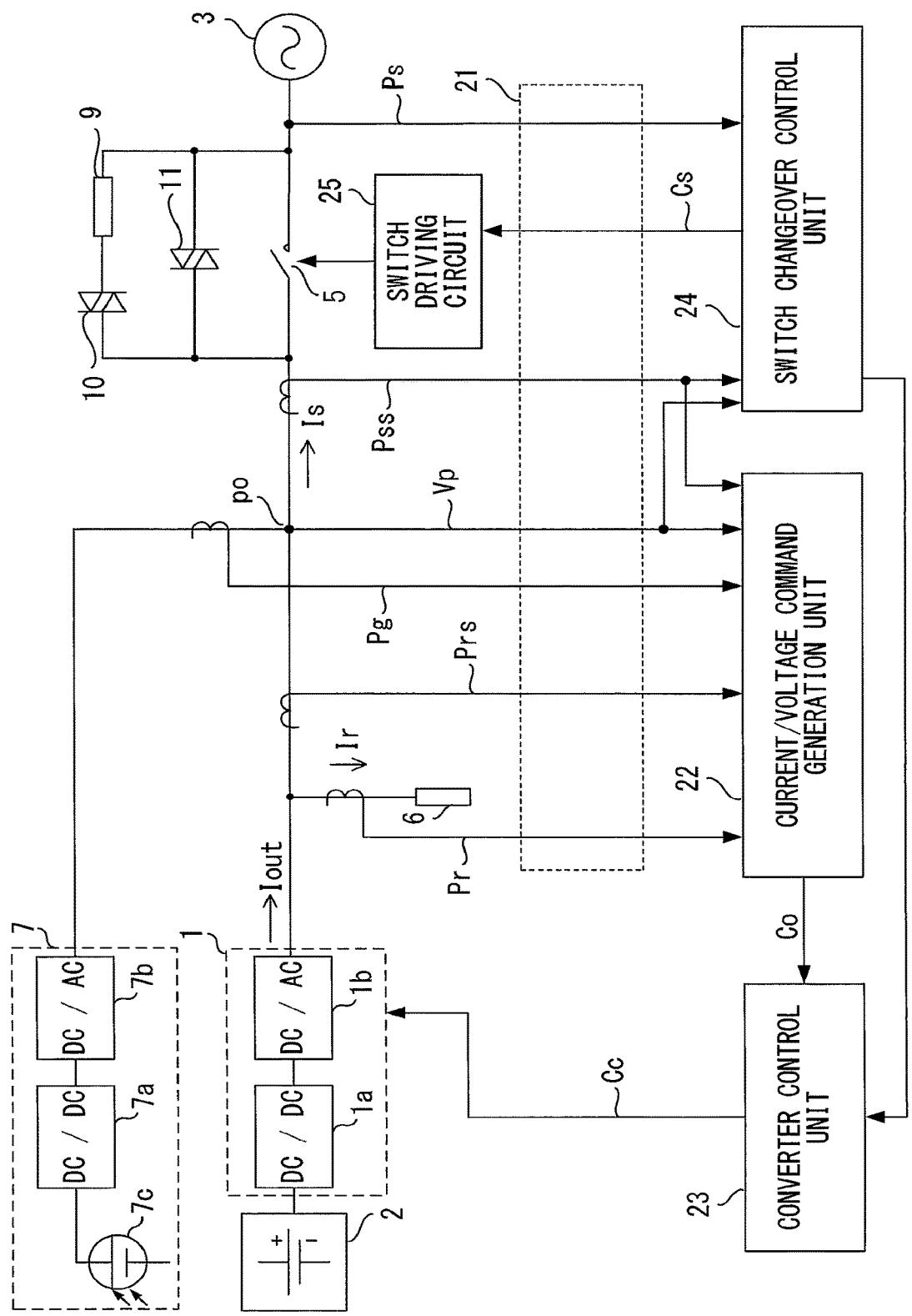
FIG. 11 is a configuration diagram showing a specific example of a power storage device, an electric generation device, and a power conversion device in the power conversion system for system interconnection in embodiment 2 shown in FIG. 7.

FIG. 10 is a configuration diagram showing a specific example of the power storage device, the electric generation device, and the power conversion device in the power conversion system for system interconnection in embodiment 1 shown in FIG. 1. FIG. 11 is a configuration diagram showing a specific example of the power storage device, the electric generation device, and the power conversion device in the power conversion system for system interconnection in embodiment 2 shown in FIG. 7. Components corresponding to those shown in FIG. 1 and FIG. 7 are denoted by the same reference characters.

As shown in FIG. 10 and FIG. 11, the power conversion device 1 shown in FIG. 1 and FIG. 7 is, as a specific example, composed of: a DC/DC conversion unit 1a which converts power from the power storage device 2 such as a storage battery or an electric vehicle (EV), to DC output power appropriate for system interconnection; and a DC/AC conversion unit 1b which converts output power from the DC/DC conversion unit 1a, to AC power needed for system interconnection with the power system 3.

Similarly, as shown in FIG. 10 and FIG. 11, the electric generation device 7 shown in FIG. 1 and FIG. 7 is, as a specific example, composed of: a DC/DC conversion unit 7a which converts power from a solar battery 7c, to DC output power appropriate for system interconnection; and a DC/AC conversion unit 7b which converts output power from the DC/DC conversion unit 7a, to AC power needed for system interconnection with the power system 3.

In the power conversion systems for system interconnection shown in FIG. 10 and FIG. 11 in embodiment 1 and embodiment 2, output via the DC/AC conversion unit 1b of the power conversion device 1 and output via the DC/AC conversion unit 7b of the electric generation device 7 are connected in common at the power reception point po on the AC side.

Here, in the electric generation device 7 having the solar battery 7c, the power reception point voltage Vp at the power reception point po is detected, and whether or not the power system 3 is abnormal is detected on the basis of determination as to voltage variation in the power reception point voltage Vp. And as a result, it may be required that output of the electric generation device 7 is stopped and the electric generation device 7 is disconnected from the power system 3 when the power system 3 is abnormal In such a case, if abnormality of the power system 3 is detected on the basis of voltage variation in the power reception point voltage Vp at the time of momentary power interruption, the electric generation device 7 is stopped and then it takes some time from stop of the electric generation device 7 until restarting. As a result, it is difficult to return flow power at the time of recovery from the momentary power interruption, to the flow power before occurrence of the momentary power interruption.

In general, in the electric generation device 7 having the solar battery 7c, performing control so as to maximize output power that can be taken from the solar battery 7c is prioritized. Therefore, AC current control is performed in order to maintain AC power outputted from the electric generation device 7. However control for suppressing variation in the power reception point voltage Vp at the power reception point po is not actively performed. Therefore, it is required that maintenance of the power reception point voltage Vp at the time of power outage as shown in the above embodiment 1 (FIG. 10) and embodiment 2 (FIG. 11) is mainly performed by using the power conversion device 1 connected to the power storage device 2.

In the case where the electric generation device 7 performs the determination as to voltage variation in the power reception point voltage Vp at the power reception point po, the determination is often performed on the basis of the frequency of the power reception point voltage Vp. In addition, as to the frequency of the power reception point voltage Vp, a detection method using voltage at the time when the polarity of AC voltage is switched, is often used. Thus control performance for maintaining the power reception point voltage Vp at high speed is required in order to maintain the frequency.

That is, in the device configuration in which the power conversion device 1 and the electric generation device 7 are connected at the AC-side power reception point as shown in FIG. 10 and FIG. 11, as to the power conversion device 1 connected to the power storage device 2, control performance for maintaining the power reception point voltage Vp at high speed is required in order to prevent the electric generation device 7 from detecting abnormality of the power system and being stopped at the time of power outage or the like as described above. Thus, in order to achieve control performance for maintaining the power reception point voltage Vp at high speed, a high-speed power information detection unit 21 and a CPU (current/voltage command generation unit 22, converter control unit 23) for controlling voltage/current at high speed are required. Whereby a problem exists in that the cost of the entire device increases.

Figure 12:
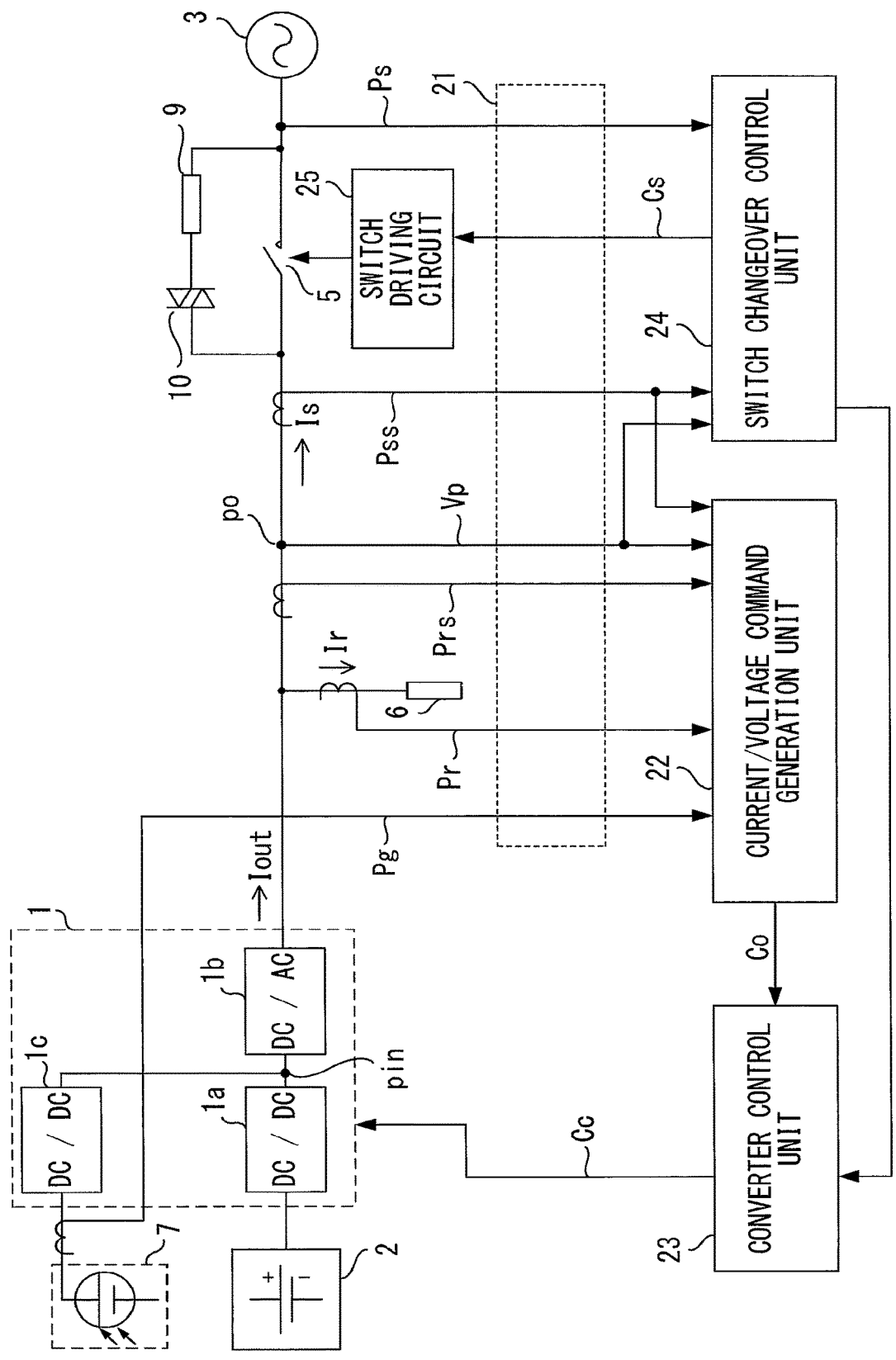
FIG. 12 is a configuration diagram showing a specific example of a power storage device, an electric generation device, and a power conversion device in a power conversion system for system interconnection according to embodiment 3 of the present invention in the case of corresponding to embodiment 1 shown in FIG. 1.
Figure 13:
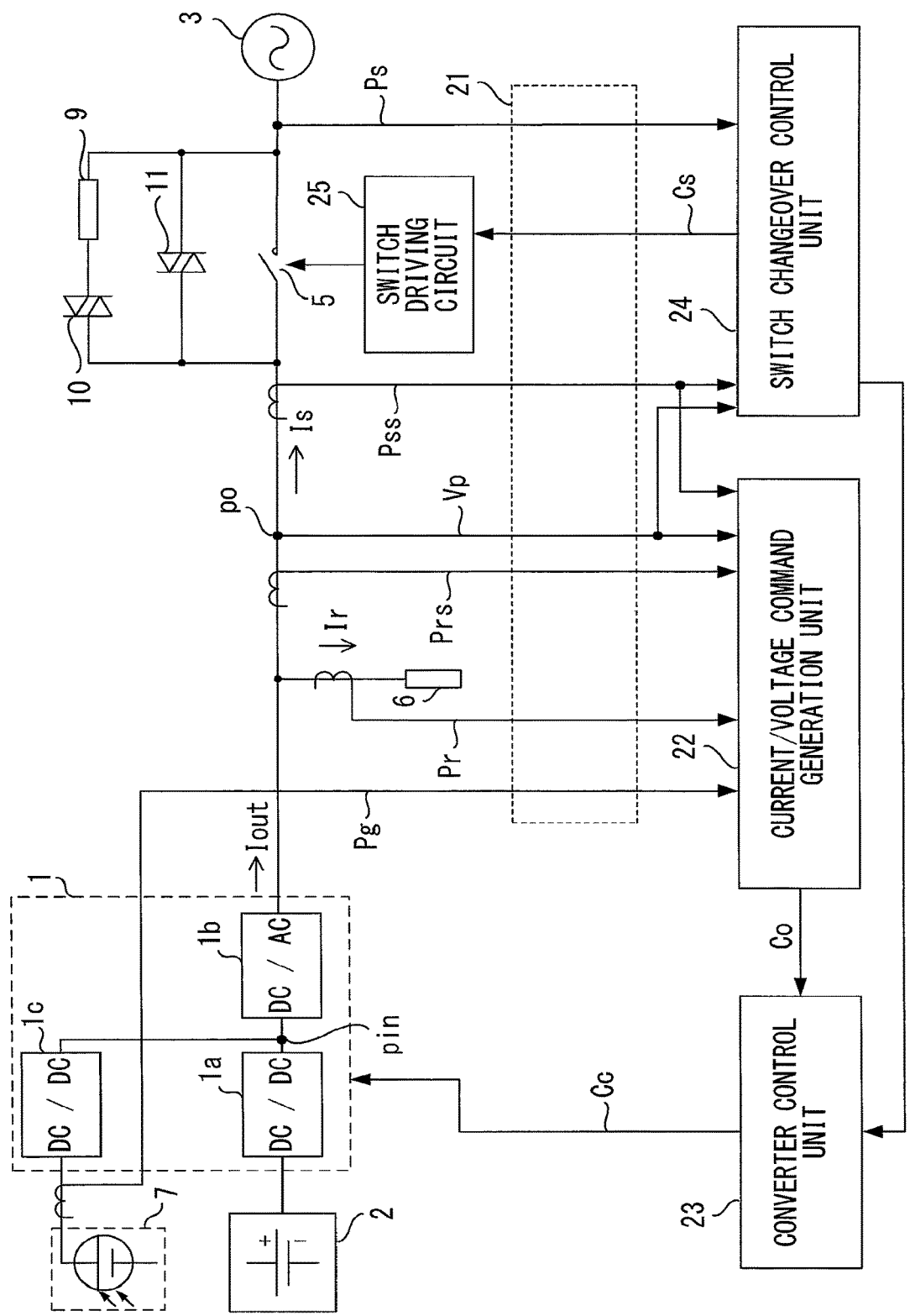
FIG. 13 is a configuration diagram showing a specific example of a power storage device, an electric generation device, and a power conversion device in a power conversion system for system interconnection according to embodiment 3 of the present invention in the case of corresponding to embodiment 2 shown in FIG. 7.

In view of this, in the present embodiment 3, the power conversion device 1 and the electric generation device 7 in the power conversion system for system interconnection are configured as shown in FIG. 12 or FIG. 13.

FIG. 12 is a configuration diagram showing a specific example of the power storage device, the electric generation device, and the power conversion device in the power conversion system for system interconnection according to embodiment 3 of the present invention in the case of corresponding to embodiment 1 shown in FIG. 1. FIG. 13 is a configuration diagram showing a specific example of the power storage device, the electric generation device, and the power conversion device in the power conversion system for system interconnection according to embodiment 3 of the present invention in the case of corresponding to embodiment 2 shown in FIG. 7. Components corresponding to those shown in FIG. 1 or FIG. 7 in embodiment 1 or 2 are denoted by the same reference characters.

As shown in FIG. 12 and FIG. 13, in the present embodiment 3, the electric generation device 7 is composed of only a solar battery, and a DC/DC conversion unit 1c which performs conversion to DC output voltage appropriate for system interconnection is connected to the electric generation device 7. On the other hand, a DC/DC conversion unit 1a which performs conversion to DC output voltage appropriate for system interconnection is connected to the power storage device 2 such as a storage battery or an electric vehicle (EV), a DC/AC conversion unit 1b which converts output of each DC/DC conversion unit 1a, 1c to AC power necessary for system interconnection with respect to the power system 3 is provided, and the output sides of the DC/DC conversion unit 1a and the DC/DC conversion unit 1c are connected in common at an input point pin of the DC/AC conversion unit 1b. The power conversion device 1 is configured by the DC/DC conversion units 1a, 1c and the DC/AC conversion unit 1b.

As described above, by using the configurations shown in FIG. 12 or FIG. 13, the electric generation device 7 is not directly connected to the power reception point po. Therefore, unlike embodiments 1, 2, it is unnecessary for the electric generation device 7 to have a function of, by detecting variation in the power reception point voltage Vp, detecting abnormality of the power system 3 and stopping the electric generation device 7.

As described above, in the power conversion system for system interconnection according to the present embodiment 3, the DC/DC conversion units 1a, 1c which convert powers from the electric generation device 7 and the power storage device 2 to voltage appropriate for system interconnection are provided, and outputs of the DC/DC conversion units 1a, 1c connected to the electric generation device 7 and the power storage device 2 are connected at the input point pin of the DC/AC conversion unit 1b. As a result, it is unnecessary for the electric generation device 7 to have a function of, by detecting variation in the power reception point voltage Vp, detecting abnormality of the power system 3 and stopping the electric generation device 7. Thus, maintenance of the power reception point voltage Vp of the power conversion device 1 can be performed at a comparatively low speed. That is, the power conversion system for system interconnection does not need to have a high-speed power information detection unit 21 and a CPU (current/voltage command generation unit 22, converter control unit 23) for controlling voltage and current at high speed, and thus the device cost can be reduced.

In embodiment 3 shown in FIG. 12 and FIG. 13, the power storage device 2 and the electric generation device 7 are provided separately from each other, and the power storage device 2 and the electric generation device 7 are respectively connected to the DC/DC conversion units 1a, 1c of the power conversion device 1. However, in the case where a plurality of power storage devices 2 and/or a plurality of electric generation devices 7 are provided, a configuration may be used in which the DC/DC conversion unit 1a, 1c is provided for each of the plurality of the devices and these DC/DC conversion units 1a, 1c are connected in common at the input point pin of the DC/AC conversion unit 1b.

The present invention is not limited to only the configurations of the above embodiments 1 to 3. Without departing from the scope of the present invention, the configurations of embodiments 1 to 3 may be partially modified or partially omitted. Further, the configurations of embodiments 1 to 3 may be combined appropriately.

The invention claimed is:

1. A power conversion system for system interconnection, which includes a power conversion device connected to a power system via an interconnection switch, wherein in parallel with the interconnection switch, a series circuit is connected which is composed of a voltage maintenance load for maintaining necessary voltage for a user load at a time of momentary power interruption of the power system, and a load disconnection switch for disconnecting from the voltage maintenance load, the power conversion system comprising:
   a power information detection unit which detects at least one of system power information about the power system, load power information about load power supplied to the user load, and flow power information about flow power between the user load and the interconnection switch;
   a current/voltage command generation unit which generates an output command for controlling output current of the power conversion device, on the basis of the power information from the power information detection unit;
   a converter control unit which controls the power conversion device on the basis of the output command from the current/voltage command generation unit; and
   a switch changeover control unit which generates a driving signal for respectively operating the interconnection switch and the load disconnection switch, on the basis of the power information from the power information detection unit.

2. The power conversion system for system interconnection according to claim 1, wherein the switch changeover control unit monitors voltage of a power system side of the interconnection switch, on the basis of the power information from the power information detection unit, and when the voltage of the power system becomes lower than a predetermined determination value, the switch changeover control unit turns off the interconnection switch and connects the power conversion device and the power system via the voltage maintenance load.

3. The power conversion system for system interconnection according to claim 1, wherein on the basis of the output command from the current/voltage command generation unit, the converter control unit performs control so that output voltage of the power conversion device when the interconnection switch is turned off falls within an allowable voltage range required for the user load.

4. The power conversion system for system interconnection according to claim 1, wherein after the interconnection switch is switched from off to on by the switch changeover control unit at a time of recovery from the momentary power interruption, the current/voltage command generation unit gives an output command to the converter control unit so that flow power between the power system and the user load or an electric generation device becomes substantially the same before and after occurrence of the momentary power interruption.

5. The power conversion system for system interconnection according to claim 1, wherein when the interconnection switch is switched from off to on by the switch changeover control unit at a time of recovery from the momentary power interruption, the current/voltage command generation unit gives a current command to the power conversion device so that current flowing through the interconnection switch is minimized.

6. The power conversion system for system interconnection according to claim 1, wherein
   in parallel with the interconnection switch, an auxiliary switch is connected in addition to the series circuit composed of the voltage maintenance load and the load disconnection switch, and
   the switch changeover control unit generates a driving signal for respectively operating the interconnection switch, the load disconnection switch, and the auxiliary switch, on the basis of the power information from the power information detection unit.

7. The power conversion system for system interconnection according to claim 6, wherein the auxiliary switch can switch faster than the interconnection switch.

8. The power conversion system for system interconnection according to claim 6, wherein
   at a time of occurrence of momentary power interruption, the switch changeover control unit performs control so as to turn off the auxiliary switch after turning off the interconnection switch, and
   at a time of recovery from the momentary power interruption, the switch changeover control unit performs control so as to turn on the interconnection switch after turning on the auxiliary switch first.

9. The power conversion system for system interconnection according to claim 1, further comprising:
   an electric generation device and a power storage device, wherein
   the power conversion device includes:
      DC/DC conversion units which respectively convert power of the electric generation device and the power storage device to voltage appropriate for system interconnection; and a DC/AC conversion unit which converts output of each DC/DC conversion unit to AC power required for system interconnection with the power system, and output sides of the DC/DC conversion units are connected in common at an input point of the DC/AC conversion unit.

10. The power conversion system for system interconnection according to claim 9, wherein at least one of the electric generation device and the power storage device comprises a plurality of electric generation devices and/or a plurality of power storage devices, respectively, and the DC/DC conversion units are respectively provided for the plurality of electric generation devices and/or the plurality of power storage devices.

11. The power conversion system for system interconnection according to claim 2, wherein on the basis of the output command from the current/voltage command generation unit, the converter control unit performs control so that output voltage of the power conversion device when the interconnection switch is turned off falls within an allowable voltage range required for the user load.

12. The power conversion system for system interconnection according to claim 2, wherein after the interconnection switch is switched from off to on by the switch changeover control unit at a time of recovery from the momentary power interruption, the current/voltage command generation unit gives an output command to the converter control unit so that flow power between the power system and the user load or an electric generation device becomes substantially the same before and after occurrence of the momentary power interruption.

13. The power conversion system for system interconnection according to claim 3, wherein after the interconnection switch is switched from off to on by the switch changeover control unit at a time of recovery from the momentary power interruption, the current/voltage command generation unit gives an output command to the converter control unit so that flow power between the power system and the user load or an electric generation device becomes substantially the same before and after occurrence of the momentary power interruption.

14. The power conversion system for system interconnection according to claim 2, wherein when the interconnection switch is switched from off to on by the switch changeover control unit at a time of recovery from the momentary power interruption, the current/voltage command generation unit gives a current command to the power conversion device so that current flowing through the interconnection switch is minimized.

15. The power conversion system for system interconnection according to claim 3, wherein when the interconnection switch is switched from off to on by the switch changeover control unit at a time of recovery from the momentary power interruption, the current/voltage command generation unit gives a current command to the power conversion device so that current flowing through the interconnection switch is minimized.

16. The power conversion system for system interconnection according to claim 4, wherein when the interconnection switch is switched from off to on by the switch changeover control unit at the time of recovery from the momentary power interruption, the current/voltage command generation unit gives a current command to the power conversion device so that current flowing through the interconnection switch is minimized.

17. The power conversion system for system interconnection according to claim 2, wherein in parallel with the interconnection switch, an auxiliary switch is connected in addition to the series circuit composed of the voltage maintenance load and the load disconnection switch, and the switch changeover control unit generates a driving signal for respectively operating the interconnection switch, the load disconnection switch, and the auxiliary switch, on the basis of the power information from the power information detection unit.

18. The power conversion system for system interconnection according to claim 3, wherein in parallel with the interconnection switch, an auxiliary switch is connected in addition to the series circuit composed of the voltage maintenance load and the load disconnection switch, and the switch changeover control unit generates a driving signal for respectively operating the interconnection switch, the load disconnection switch, and the auxiliary switch, on the basis of the power information from the power information detection unit.

19. The power conversion system for system interconnection according to claim 4, wherein in parallel with the interconnection switch, an auxiliary switch is connected in addition to the series circuit composed of the voltage maintenance load and the load disconnection switch, and the switch changeover control unit generates a driving signal for respectively operating the interconnection switch, the load disconnection switch, and the auxiliary switch, on the basis of the power information from the power information detection unit.

20. The power conversion system for system interconnection according to claim 7, wherein at a time of occurrence of momentary power interruption, the switch changeover control unit performs control so as to turn off the auxiliary switch after turning off the interconnection switch, and at a time of recovery from the momentary power interruption, the switch changeover control unit performs control so as to turn on the interconnection switch after turning on the auxiliary switch first.

21. A power conversion system for system interconnection, which includes a power conversion device connected to a power system via an interconnection switch, wherein in parallel with the interconnection switch, a series circuit is connected which is composed of a voltage maintenance load for maintaining necessary voltage for a user load at a time of momentary power interruption of the power system, and a load disconnection switch for disconnecting from the voltage maintenance load, the power conversion system comprising:

a power information detector including sensors that detect power information including at least one of system power information about the power system, load power information about load power supplied to the user load, and flow power information about flow power between the user load and the interconnection switch;

processing circuitry configured to generate an output command for controlling output current of the power conversion device, based on the power information from the power information detector;

the processing circuitry is further configured to control the power conversion device based on the output command; and the processing circuitry is further configured to generate a driving signal for respectively operating the interconnection switch and the load disconnection switch, based on the power information from the power information detector.

22. A method of operating a power conversion system for system interconnection, the power conversion system including a power conversion device connected to a power system via an interconnection switch, wherein in parallel with the interconnection switch, a series circuit is connected which is composed of a voltage maintenance load for maintaining necessary voltage for a user load at a time of momentary power interruption of the power system, and a load disconnection switch for disconnecting from the voltage maintenance load, the method comprising:

detecting power information including at least one of system power information about the power system, load power information about load power supplied to the user load, and flow power information about flow power between the user load and the interconnection switch;

generating an output command for controlling output current of the power conversion device, based on the power information from the detecting;

controlling the power conversion device based on the output command; and generating a driving signal for respectively operating the interconnection switch and the load disconnection switch, based on the power information from the detecting.

\* \* \* \* \*